United States Patent [19]

Yarnall, Sr. et al.

[11] Patent Number: 4,733,633

[45] Date of Patent: Mar. 29, 1988

[54] ELECTRONIC CONFINEMENT ARRANGEMENT FOR ANIMALS

[76] Inventors: Robert G. Yarnall, Sr.; Robert G. Yarnall, Jr., both of P.O. Box 356, Kimberton, Pa. 19442

[21] Appl. No.: 932,608

[22] Filed: Nov. 20, 1986

[51] Int. Cl.⁴ .............................................. A01K 15/00
[52] U.S. Cl. ..................................... 119/29; 340/573
[58] Field of Search ...................... 119/29, 106, 20, 96; 340/573; 256/10

[56] References Cited

U.S. PATENT DOCUMENTS

| | | | |
|---|---|---|---|
| 3,589,337 | 6/1971 | Doss | 119/106 |
| 3,753,421 | 8/1973 | Peck | 119/29 |
| 3,777,712 | 12/1973 | Gardiner et al. | 119/29 |
| 3,980,051 | 9/1976 | Fury | 119/29 |
| 4,136,338 | 1/1979 | Antenore | 340/551 |
| 4,202,293 | 5/1980 | Gonda et al. | 119/29 |

FOREIGN PATENT DOCUMENTS

| | | | |
|---|---|---|---|
| 3237927 | 4/1984 | Fed. Rep. of Germany | 119/29 |
| 2455843 | 5/1979 | France | 119/29 |

Primary Examiner—Robert P. Swiatek
Assistant Examiner—R. Thomas Price
Attorney, Agent, or Firm—Ruth Moyerman

[57] ABSTRACT

An arrangement for controlling the movements of animals is disclosed. A pair of signal-broadcasting wire loops is used, arranged in a concentric fashion, to define the desired confinement area. As the animal approaches the inner wire loop, a receiver worn by the animal will pick up the broadcasted signal and give the animal a mild shock and/or emit an unpleasant noise. If the animal ignores these deterrents and continues to move out of the confinement area, its receiver will pick up the signal emitted by the outer wire, where this signal will trigger an alarm located at a base station (the owner's home), indicating to the owner that the animal has ignored the signals and is leaving the confinement area.

32 Claims, 4 Drawing Figures

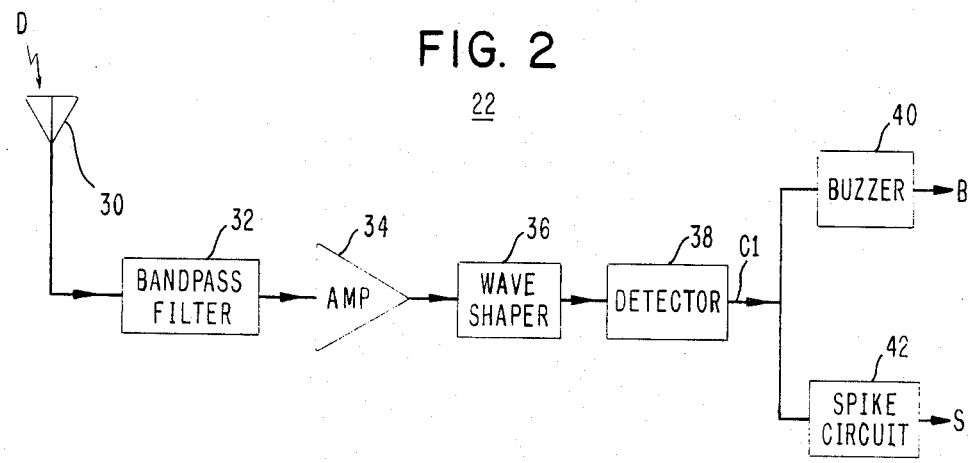

ELECTRONIC CONFINEMENT ARRANGEMENT FOR ANIMALS

BACKGROUND OF THE INVENTION

1. Field of the Invention

The present invention relates to an electronic confinement arrangement for animals and, more particularly, to a wire fence confinement arrangement which will cause a deterrent signal to be given to an animal as it approaches the boundary and also transmit an alarm signal to the owner if the animal ignores the deterrent and leaves the confinement area.

2. Description of the Prior Art

It is often advantageous to confine an animal, for example, a dog, to a certain area and have some means to teach the animal not to leave the area. Alternatively, there are also situations where one would like to prohibit an animal from entering a designated area, for example, a garden or children's play area. Many times, it is impossible for the owner to constantly observe the animal, and another type of surveillance is necessary.

One system for teaching an animal to stay in a certain area is disclosed in U. S. Pat. No. 3,980,051 to Fury which includes a first ultrasonic pulse transceiver worn by a trainer and a second ultrasonic transceiver worn by the animal. The round-trip transit time of the pulse from the trainer to the dog and back to the trainer is monitored by the trainer's device. The device will then transmit a dog whistle sound when the transit time exceeds a predetermined value as set by the trainer. A problem with this arrangement is that it is not well suited to confining an animal to a designated area, since the transit time to one boundary may be different than the transit time to another boundary; for example, the distance between adjacent backyards. Further, it is possible that the animal will ignore the dog whistle sound and wander away from the designated area.

An alternative prior art arrangement is disclosed in U.S. Pat. No. 3,753,421 to Peck in which an arrangement for controlling an animal to prevent it from moving out of or into a restricted area is disclosed. A signal-emitting wire is used to define the restricted area and the animal wears a receiver in the form of a collar. When the animal nears the wire, the collar picks up the transmitted signal which triggers a circuit in the collar to give the animal an electric shock. Like the Fury arrangement, however, animals may ignore the electric shock given by the Peck collar and move out of the restricted area.

Thus, there remains in the prior art a need for an animal confinement system which is capable of signalling a trainer or owner when the animal has ignored the deterrent signal and has crossed the designated boundary line.

SUMMARY OF THE INVENTION

The problem remaining in the prior art is addressed by the present invention which related to an electronic confinement arrangement for animals, and, more particularly, to a wire fence confinement arrangement which will cause a deterrent signal to be given to an animal as it approaches the boundary and also transmit an alarm to the owner if the animal ignores the deterrent and leaves the confinement area.

The present invention utilizes a pair of signal-emitting wire loops in a concentric arrangement and a receiver worn by the animal. The first, or inner, loop transmits a signal which causes the receiver to produce an annoying audio signal or an electrical shock, or both. If the animal ignores this deterrent and approaches the second, or outer, loop, the signal emitted by the second loop will trigger the animal's receiver to transmit an "escape" alarm signal to a unit located at a base location (for example, in the owner's house).

An additional aspect of the present invention is the ability to confine a number of animals to the same area and provide a means of indicating which particular animals have approached the boundary or have left the confinement area. In accordance with this aspect of the invention, each animal receiver unit broadcasts a different "escape" alarm signal back to the base location. The receiver at the base location is able to discern between the different frequencies and indicate by an appropriate means which animal has left.

Other and further aspects of the present invention will be apparent during the course of the following discussion.

BRIEF DESCRIPTION OF THE DRAWING(S)

FIG. 2 illustrates an exemplary deterrent circuit included in the animal's receiver for the arrangement of FIG. 1.

FIG. 3 illustrates an exemplary alarm circuit included in the animal's receiver for the arrangement of FIG. 1.

FIG. 4 illustrates an exemplary alarm receiver located at the base location of the arrangement of FIG. 1.

DETAILED DESCRIPTION OF THE PREFERRED EMBODIMENT(S)

Figure 1:
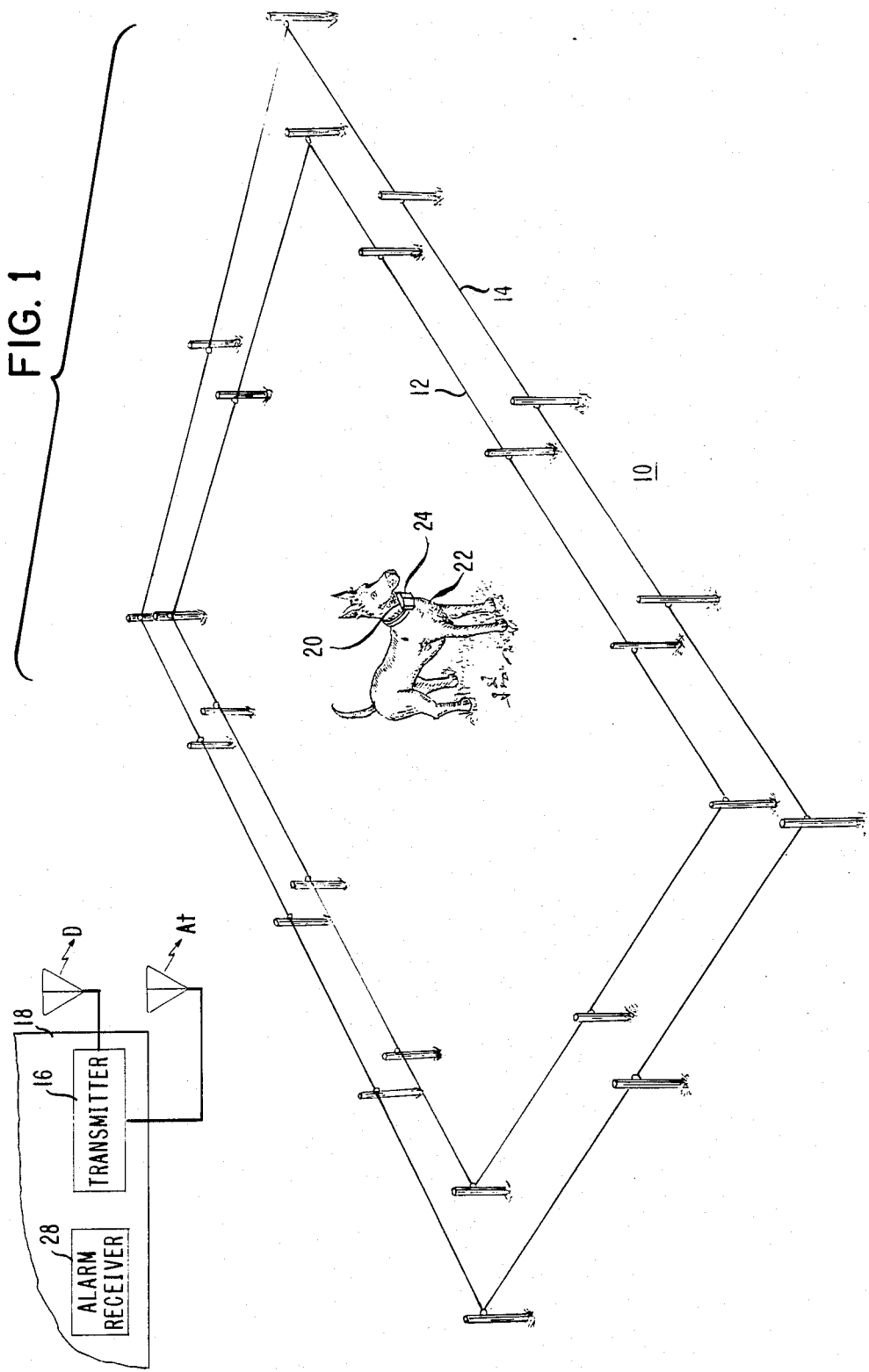
FIG. 1 illustrates an exemplary confinement arrangement of the present invention.

FIG. 1 illustrates an exemplary confinement arrangement 10 of the present invention. In this particular application of the present invention, it is desired to keep a dog from leaving a designated area, presumably a pen or a yard. An inner wire loop 12 and outer wire loop 14 define the perimeter of the designated area. Loops 12 and 14 may be either above or below ground and are capable of broadcasting signals provided by a transmitting unit 16 located at a base station 18. Transmitting unit 16, which may be any type of transmitter design well known in the art capable of generating an oscillating signal at a predetermined frequency, transmits a first deterrent signal D to inner loop 12 and a second alarm trigger signal AT to loop 14. Loops 12 and 14 thus function to broadcast their respective signals in the local area. The frequencies employed in practicing the present invention are chosen to eliminate the possibility of interference between loops 12 and 14. For example, deterrent signal D may have a frequency in the range of 10–15 kHz, and alarm trigger signal At may have a frequency in the range of 20–25 kHz.

The animal wears receiver unit 20 (for example, on a special collar) which is responsive to both signals D and AT. As the animal nears the border of the restricted area defined by inner wire loop 12, receiver 20 will pick up broadcasted deterrent signal D. Upon reception of signal D, a deterrent circuit 22 of receiver 20 will utilize signal D to generate a mild electrical shock S which is applied to the animal to encourage the animal to move away from the border of the area. Deterrent circuit 22 may also generate an audible output signal which is unpleasant to the animal (for example, a dog whistle sound), as an additional deterrent signal. A detailed description of exemplary deterrent circuit 22 follows in association with the discussion of FIG. 2.

In most cases, the use of the electrical shock and/or the audio signal will be sufficient to cause the animal to move away from the edge of the confinement area. However, some animals may ignore both of these deterrents and continue to wander out of the confinement area. The wandering animal will then come within the broadcast range of outer loop 14. Receiver 20 includes an alarm trigger circuit 24 which is receptive to alarm trigger signal AT broadcast by outer loop 14, where FIG. 3 illustrates an exemplary configuration of alarm trigger circuit 24. Upon reception of signal AT, alarm trigger circuit 24 will broadcast an alarm activation signal A back to alarm receiver 26 located at base station 18. Therefore, if the animal leaves the confinement area, receiver 20 will activate the owner's alarm, warning him that the animal has ignored the deterrents and is escaping.

In an alternative embodiment of the present invention, a plurality of different alarm circuits 24, each capable of broadcasting a different frequency, may be utilized when a number of different animals are confined to the same area. Alarm unit 28 is then able to receive the different frequencies, sounding a different alarm signal for each frequency. In this manner, the owner is able to identify which animal has moved out of the designated confinement area.

An exemplary deterrent circuit 22 which is worn by a confined animal is illustrated in FIG. 2. It is to be understood that the circuit is exemplary only, and any circuit capable of receiving a broadcasted signal and generating an electrical shock and audio output signal may be used in practicing the invention.

Referring to FIG. 2, signal D broadcast by inner loop 12, will be picked up by antenna 30 as the animal nears the loop. Signal D then passes through filter 32 which eliminates frequencies below 60 Hz and above a level used by the confinement system. In the exemplary arrangement of FIG. 2, the frequency of 100 kHz is chosen as the upper limit of filter 32. As shown, filter 32 is a bandpass filter. Alternatively, a pair of band rejection filters at 60 Hz and 100 kHz may also be used. In general, any filtering scheme capable of limiting the frequency range of the signal passing through the remainder of circuit 22 may be used.

Referring back to FIG. 2, the output from filter 32 is subsequently applied as an input to amplifier 34 which functions to boost the signal level of the transmitted deterrent signal to a level sufficient to energize the remainder of the circuitry. An amplifier with a gain of, for example, 100, is sufficient for this purpose. The output from amplifier 34 may then be passed through a wave shaper 36 which uses circuitry well known in the art to "smooth" out the shape of the signal since low noise levels, amplified by amplifier 34, may interfere with the operation of circuit 22. However, to reduce the size, cost and complexity of deterrent circuit 22, wave shaper 36 may be eliminated, the penalty being some degradation in the performance of the system.

The output signal from wave shaper 36 is then applied as an input to detector 38. Detector 38, which may be a phase detector, will detect the presence of the known frequency (10-15 kHz, for example) of deterrent signal D and produce as an output control signal C1. Control signal C1 is utilized to trigger buzzer 40 which emits sound B which is unpleasant to the animal (for example, a dog whistle). Additionally, control signal C1 triggers spike circuit 42 which produces a pulse output S of sufficient voltage and amperage so as to give the animal a mild electrical shock. In operation of the invention, the output of deterrent circuit 22 may be configured so that only one of these two outputs is provided, if so desired. Buzzer 40 and spike circuit 42 comprise components well known in the art for providing the desired output signals.

An exemplary alarm circuit 24 for activating the escape signal at the base station is shown in FIG. 3. As stated above, if the animal ignores the deterrent signals from circuit 22 and continues to wander from the designated confinement area, it will enter the field of outer wire loop 14 and the animal's receiver 20 will pick up alarm trigger signal AT broadcast by outer loop 14. As stated above, frequencies in the range of 20-25 kHz may be broadcast over outer wire loop 14 without interfering with the lower frequency signals broadcast by inner wire loop 12.

In a similar fashion as deterrent circuit 22, the higher frequency alarm trigger signal AT broadcast by outer loop 14 will be picked up by an antenna 50 included in alarm circuit 24 and then passed through filter 52, filter 52 being similar in form and function to filter 32 of circuit 22. The filtered output signal from bandpass filter 52 is subsequently passed through amplifier 54 and shaping circuit 56, both amplifier 54 and shaper 56 being similar to their like components in deterrent circuit 22. The output of wave shaper 56 is then applied as an input to detector 58, where detector 58 may be a phase detector. Upon detecting the presence of alarm signal AT, detector 58 generates an output control signal C2 which is applied as an input to turn on oscillator 60. Oscillator 60 is used to generate as an output oscillating alarm activation signal A at the desired alarm frequency, for example 50 kHz. This alarm activation signal A is then passed through a wave shaper 62 and amplified by amplifier 64 before being broadcast by antenna 66 back to alarm receiver 28 located at base station 18 (not shown).

FIG. 4 illustrates an exemplary alarm receiver 28 for providing a warning signal to the owner when an animal has moved away from the designated confinement area. Similar to the operation of circuits 22 and 24, alarm receiver 28 comprises antenna 70 for reception of alarm activation signal A generated by alarm trigger circuit 24 worn by the animal. The received signal subsequently passes through filtering means, illustrated in the embodiment of FIG. 4 as first band reject filter 72 and second band reject filter 74, where filter 72 is set to reject 60 Hz and filter 74 is set to reject 100 kHz. Such an arrangement of a pair of band reject filters may be utilized interchangeably with bandpass filters 32 and 52 described above.

The filtered alarm activation signal is then amplified by amplifier 76 and returned to a "smooth" and clean waveform by wave shaper 78, so as to rid the signal of any spurious signal noise introduced by amplifier 76. The output from wave shaper 78 is then applied as an input to a detector 80, where detector 80 may be a phase detector well known in the art for ascertaining the presence of the predetermined broadcast frequency (50 kHz, for example) animal's alarm activation signal. Upon reception of this alarm signal, detector 80 produces an alarm control signal AC which activates alarm unit 82. Alarm unit 82 is used to provide an indication that the animal has left the confinement area. This alarm signal may take any desired form, examples being an audible alarm signal, a flashing light, or a display of a particular word, such as "escape".

As mentioned above, an aspect of the present invention is that it is possible to utilize a configuration capable of indicating the escape of a particular animal when a plurality of N animals are confined to the same area. In this arrangement, the alarm activation signals produced by each animal's receiver will comprise a different frequency (f1, f2, ... fN). Accordingly, phase detector 80 is configured to produce a different output alarm signal for each received frequency. For example, if a dog with collar receiver 20 set to broadcast an alarm activation signal at frequency f2 has left the area, frequency f2 will cause detector 80 to generate alarm control signal AC2 and light escape alarm light 2. In this manner, the owner will know which animal has left the area.

Having now illustrated and described my invention, it is not intended that such description limit this invention, but rather that this invention be limited only by reasonable interpretation of the appended Claims.

What is claimed is:

1. An arrangement for confining at least one animal to a designated area comprising:
   (a) a transmitter located at a base station capable of generating a first signal (D) and second signal (AT);
   (b) a first signal-emitting wire responsive to said first transmitted signal and a second signal-emitting wire responsive to said second transmitted signal, said first and second wires disposed in a concentric arrangement as an inner wire and an outer wire, respectively, so as to define said designated area;
   (c) a receiver capable of being attached to the animal and responsive to both said first and said second transmitted signals, said receiver including:
      (i) a deterrent circuit responsive to said first transmitted signal for producing as an output a deterrent signal which is applied to the animal; and
      (ii) an alarm trigger circuit responsive to the presence of said second transmitted signal for producing and broadcasting to an alarm receiver only after said second transmitted signal is received by said alarm trigger circuit an alarm activation signal; and
   (d) said alarm receiver placed at a predetermined location capable of receiving and detecting the presence of said broadcast alarm activation signal and producing as an output an escape alarm signal.

2. The confinement arrangement of claim 1 wherein said receiver deterrent circuit produces an electric shock as an output deterrent signal.

3. The confinement arrangement of claim 1 wherein said receiver deterrent circuit produces as an output deterrent signal an audio signal at a predetermined frequency which is unpleasant to at least one animal.

4. The confinement arrangement of claim 1 wherein said receiver deterrent circuit produces as an output deterrent signal both an electric shock and an audio signal at a predetermined frequency which is unpleasant to at least one animal.

5. The confinement arrangement of claim 1 wherein said deterrent circuit comprises:
   (a) an antenna capable of receiving the deterrent signal broadcast by the first signal-emitting wire;
   (b) filtering means responsive to the received signal for eliminating frequency components below a first predetermined frequency and above a second predetermined frequency, said second predetermined frequency being greater than the predetermined frequency of alarm activation signal;
   (c) amplifying means coupled to the output of said filtering means for increasing the signal level of the filtered received signal;
   (d) shaping means coupled to the output of said amplifying means for eliminating amplifying-induced perturbations on said deterrent signal;
   (e) detecting means coupled to the output of said shaping means for detecting the presence of said deterrent signal broadcast by said first signal-emitting wire and providing as an output a control signal of a first predetermined value when said deterrent signal is present; and
   (f) deterrent means responsive to the control output signal from said detecting means for providing the deterrent output signal of said deterrent circuit when said control signal comprises its associated first predetermined value.

6. The confinement arrangement of claim 5 wherein said filtering means comprises a bandpass filter.

7. The confinement arrangement of claim 6 wherein said first predetermined frequency is 60 Hz.

8. The confinement arrangement of claim 6 wherein said second predetermined frequency is 100 kHz.

9. The confinement arrangement of claim 5 wherein said filtering means comprises a first band reject filter at the first predetermined frequency and a second band reject filter at the second predetermined frequency.

10. The confinement arrangement of claim 9 wherein said first predetermined frequency is 60 Hz.

11. The confinement arrangement of claim 9 wherein said second predetermined frequency is 100 kHz.

12. The confinement arrangement of claim 5 wherein said deterrent means generates as an output a mild electric shock.

13. The confinement arrangement of claim 5 wherein said deterrent means generates as an output an audio signal at a predetermined frequency which is unpleasant to at least one animal.

14. The confinement arrangement of claim 5 wherein said deterrent means generates as an output both a mild electric shock and an audio signal at a predetermined frequency which is unpleasant to at least one animal.

15. The confinement arrangement of claim 1 wherein said alarm trigger circuit comprises:
   (a) an antenna for receiving said alarm trigger signal broadcast by the second signal-emitting wire;
   (b) filtering means responsive to the received signal for eliminating frequencies below a first predetermined frequency and above a second predetermined frequency;
   (c) amplifying means coupled to the output of said filtering means for increasing the signal level of the filtered received signal;
   (d) shaping means coupled to the output of said amplifying means for eliminating any amplifying-induced perturbations on said alarm trigger signal;
   (e) detecting means coupled to the output of said shaping means for detecting the presence of said alarm trigger signal and generating as an output a control signal when said alarm trigger signal is present;
   (f) oscillating means responsive to the control signal output of said detecting means for generating an output signal at a predetermined frequency during the presence of said control signal;

(g) amplifying means coupled to the output of said oscillating means for increasing the signal level of the oscillation signal; and (h) an antenna for broadcasting as the alarm activation output of said alarm trigger circuit the amplified oscillating signal.

16. The confinement arrangement of claim 15 wherein said filtering means comprises a bandpass filter capable of eliminating frequency components below the first predetermined frequency and above the second predetermined frequency.

17. The confinement arrangement of claim 16 wherein said first predetermined frequency is 60 Hz.

18. The confinement arrangement of claim 16 wherein said second predetermined frequency is 100 kHz.

19. The confinement arrangement of claim 15 wherein said filtering means comprises a first band reject filter at the first predetermined frequency and a second band reject filter at the second predetermined frequency.

20. The confinement arrangement of claim 19 wherein said first predetermined frequency is 60 Hz.

21. The confinement arrangement of claim 19 wherein said second predetermined frequency is 100 kHz.

22. The confinement arrangement of claim 15 wherein said oscillating alarm activation signal comprises a frequency of 50 kHz.

23. The confinement arrangement of claim 1 wherein said alarm receiver comprises:

(a) an antenna for receiving the alarm activation signal broadcast by the receiver;

(b) filtering means for eliminating frequency components below a first predetermined frequency and above a second predetermined frequency;

(c) amplifying means coupled to the output of said filtering means for increasing the signal level of the filtered received signal;

(d) shaping means coupled to the output of said amplifying means for eliminating amplifying-induced spurious signals from said filtered received signal;

(e) detecting means coupled to the output of said shaping means for generating as an output a control signal of a predetermined value during the presence of said alarm activation signal; and (f) alarm means responsive to said control signal for providing an alarm signal output when the control signal is of said predetermined value.

24. The confinement arrangement of claim 23 wherein said filtering means comprises a bandpass filter.

25. The confinement arrangement of claim 24 wherein said first predetermined frequency of said bandpass filter is 60 Hz.

26. The confinement arrangement of claim 24 wherein said second predetermined frequency of said bandpass filter is 100 kHz.

27. The confinement arrangement of claim 23 wherein said filtering means comprises a first band reject filter at the first predetermined frequency and a second band reject filter at the second predetermined frequency.

28. The confinement arrangement of claim 27 wherein said first predetermined level frequency is 60 Hz.

29. The confinement arrangement of claim 27 wherein said second predetermined frequency is 100 kHz.

30. The confinement arrangement of claim 23 wherein said detecting means is capable of responding to a plurality of N alarm activation signals, each signal associated with a different animal and generating, as an output, a plurality of N control signals, each control signal capable of causing said alarm means to generate a different alarm output signal.

31. The confinement arrangement of claim 23 wherein said alarm output signal produced by said alarm means is an audio signal.

32. The confinement arrangement of claim 23 wherein said alarm output signal produced by said alarm means is a visible signal.

* * * * *